United States Patent [19]
Porta et al.

[11] 4,376,022
[45] Mar. 8, 1983

[54] METHOD AND APPARATUS FOR CONCENTRATING AN AQUEOUS SLUDGE BY ELECTRO-OSMOSIS

[75] Inventors: Augusto Porta, Carouge; Antonin Kulhanek, Le Lignon, both of Switzerland

[73] Assignee: Battelle Memorial Institute, Carouge, Switzerland

[21] Appl. No.: 233,601

[22] PCT Filed: Jun. 3, 1980

[86] PCT No.: PCT/CH80/00068
§ 371 Date: Feb. 5, 1981
§ 102(e) Date: Feb. 4, 1981

[87] PCT Pub. No.: WO80/02650
PCT Pub. Date: Dec. 11, 1980

[30] Foreign Application Priority Data

Jun. 5, 1979 [CH] Switzerland ............... 5191/79

[51] Int. Cl.³ .................................................. B01D 57/02
[52] U.S. Cl. ................................. 204/180 R; 204/300 R
[58] Field of Search ....................... 204/180 R, 300 R

[56] References Cited

U.S. PATENT DOCUMENTS

| 894,070 | 7/1908 | Schwerin | 204/180 R |
| 4,244,804 | 1/1981 | Moeglich | 204/180 R |

FOREIGN PATENT DOCUMENTS

| 179086 | 11/1906 | Fed. Rep. of Germany . |
| 266971 | 11/1913 | Fed. Rep. of Germany . |
| 476144 | 5/1929 | Fed. Rep. of Germany . |
| 1927740 | 12/1970 | Fed. Rep. of Germany . |
| 68314 | 2/1951 | Netherlands . |
| 600932 | 6/1978 | Switzerland . |
| 383199 | 12/1932 | United Kingdom . |
| 1414564 | 11/1975 | United Kingdom . |

*Primary Examiner*—Howard S. Williams
*Attorney, Agent, or Firm*—Finnegan, Henderson, Farabow, Garrett & Dunner

[57] ABSTRACT

A method for concentrating aqueous sludges. The sludge circulates through an electro-osmosis enclosure (1), of which the porous walls (2, 3) retain the sludge particles but allow the liquid which separates and the gas which forms under the influence of the electric current to filter through. As the sludge descends in the enclosure, its hydrostatic pressure increases, and this reinforces the effectiveness of the electro-filtration.

11 Claims, 4 Drawing Figures

METHOD AND APPARATUS FOR CONCENTRATING AN AQUEOUS SLUDGE BY ELECTRO-OSMOSIS

FIELD OF THE INVENTION

This invention relates to a method for concentrating by electro-osmosis a fluid aqueous sludge formed from fine particles suspended in water. Such sludges are encountered for example in the residues from purification stations, in the working of argillaceous gravel pits, in the by-products resulting from the processing of certain minerals (bauxite), in the paper industry etc.

If it is required to conveniently handle such sludges, for example if they are to be gathered up mechanically in order to load a vehicle with them, it is necessary to previously dehydrate them by dewatering in order to give them the required solid consistency and to reduce their dead weight. In doing this, simple water removal under pressure is not convenient because, due to the fineness of the particles, the filter pores become rapidly blocked, the filtration slows down to an exaggerated extent, and the energy (pressure) expenditure required for extracting the liquid becomes incompatible with the results obtained.

PRIOR ART

These drawbacks have been remedied by filtration methods based on electro-filtration. In this respect, it is known that the majority of the particles of mineral sludges suspended in water become charged negatively on contact therewith, and consequently when placed in an electric field they migrate in the direction of the anode where they accumulate, to create a region depleted in solid materials in the vicinity of the cathode (electrophoresis). By disposing a microporous obstacle (membrane with osmotic properties) between these electrodes, the sludge particles are retained in the anode compartment, whereas the liquid is driven into the cathode compartment by traversing the membrane. The typical cathaphoresis filtration principle is illustrated by U.S. Pat. No. 4,003,811, which describes a method consisting of introducing a particle suspension into the anode compartment of an electrokinetic cell comprising an anode and a cathode, these being separated by a membrane which is permeable to water but is impermeable to the clay particles. A direct current is then applied across the electrodes, this causing the water to pass through the membrane and the particles to deposit on the positive electrode. This process can take place continuously, the solid clay deposit being periodically detached from the anode on which it settles, while the excess liquid of the cathode compartment is evacuated regularly. There are other electro-filtration methods based on the same principle, some also using the action of a pressure to which the sludge to be dewatered in subjected. Among the documents defining this state of the art, the following documents can be mentioned: "The Electrical Dewatering of Clay Suspensions", by C. E. CURTIS, Annual Meeting American Ceramic Society, Cleveland, Ohio, February 1931; "Electro-Osmotic and Electrophoretic Dewatering as Applied to Solid-Liquid Separation" by C. RAMPALEK, in Solid Liquid Separation by J. P. POOLE & D. DOYLE, H.M.S.O. London (1966); "Application of Electro-osmosis in the Consolidation of Clayey Soils" by L. ZARETTI, L'Energia Elettrica 27, 625-31 (1950); "Electro-Chemical Treatment of Clays" by C. M. PANT, A. KUMAR and K. P. SHUKLA, Soils & Fertilizers 16 (1953), Abstract 402; U.S. Pat. Nos. 3,773,640-2,099,328-4,001,100-4,003,819; German Pat. Nos. 163,549-316,444-154,114-124,509-128,085-131,932; French Pat. No. 2,231,627 and British Pat. No. 169,315. Thus, French patent application No. 2,231,627 (27.12.74) relates to a method for dehydrating a sludge in which the sludge is transported on a fluid-permeable belt, a direct current is passed through this sludge between the electro-endosmosis electrodes which are disposed on one side and the other of the sludge layer (i.e. the anode above and the cathode below the permeable belt), and the sludge is simultaneously subjected to pressure.

German patent DPS No. 316,444 (14.2.1918) describes a device for the electro-filtration of aqueous sludges comprising a metal cathode grid on which the sludge to be filtered is disposed, and an anode plate which can be lowered at will on to the sludge area in order to mechanically press it during the electro-filtration. The grid, which can move in the manner of an endless belt, rests on a perforated support through which the filtered liquid runs.

However, these methods are always delicate to effect because of the difficulty in balancing the effects of the electric field with those due to the pressure. In this respect, the electric field tends to retain the particles in proximity to the anode and to prevent them from blocking the cathode filter. In contrast, although the pressure favours passage of the liquid through the filter apertures, it tends to cause the particles to cake on them and to block up the pores. An energy balance therefore has to be established between the electric voltage and the dynamic pressure, the parameters of this balance varying according to the quantity of water contained in the sludge at any given time and, consequently, the degree of filtration. In this respect, the more the sludge is dehydrated, the more the filtration slows down and the higher the pressure necessary in order to maintain a sufficient filtration rate. It should be noted that it is extremely difficult to maintain a pressure higher than atmospheric pressure in the case of a continuous filtration installation, and becomes very expensive mainly because of the sealing problems which then have to be solved.

DESCRIPTION OF THE INVENTION

The method according to the invention enables the pressure to which the sludge is subjected to be raised gradually during the course of the filtration, in a particularly natural and progressive manner without using a device in which a gas pressure acts.

According to said method, the sludge is introduced into a preferably tubular enclosure of which at least one of the walls in contact with the sludge comprises a filter cathode of porous conducting material which retains the solid constituents of the sludge, but allows its liquid to pass. This cathode can consist of a porous metal plate, or more simply of a perforated metal plate covered with a very fine mesh fabric, this fabric being either conducting (metal fabric) or insulating (plastics fabric). This enclosure also obviously contains an anode disposed parallel to and face to face with the cathode at a suitable distance therefrom, said anode being also in contact with the sludge. A voltage is then applied across the electrodes which is sufficient to create an electric field through the sludge and thus cause the liquid to pass through the filter cathode by electro-osmosis. This voltage is of the order of 10 to 70 V/cm. The sludge is simultaneously circulated from the top downwards in the enclosure, the longitudinal axis of this latter being in a non-horizontal position. Each element of the sludge under movement is then subjected to a hydrostatic pressure which increases with its downward movement, the effect of this pressure on the exudation of the liquid progressively reinforcing that of the electric field and increasing the relative efficiency of the filtration as the sludge descends in the enclosure and as it thickens.

The increase in the hydrostatic pressure to which the sludge is subjected per cm of travel is obviously a function of the inclination of the enclosure. It is at a maximum when the enclosure is in a vertical position. If required, the sludge in the enclosure can be subjected to an additional overall pressure, for example an air or gas pressure, or a mechanical pressure by means of a piston or by pressing by means of the anode.

It should be noted that German patent DRP No. 476 144 describes a device for dehydrating sludges by electro-osmosis. FIG. 1 of the drawing of this patent represents a tube of rectangular cross-section, of which two of the opposing walls are fitted with electrodes, the cathode being perforated and allowing passage of a liquid. The bottom of the tube is closed by a mobile slide valve. The sludge is introduced under pressure into the top of the tube where it becomes dehydrated, the water flowing through the cathode and from there out of the tube through an outlet channel. Once the sludge has been sufficiently dehydrated, the lower outlet of the tube is uncovered by pulling back the slide valve so that said sludge is expelled to the outside. This device operates intermittently and the filtration is carried out under pressure, these constituting two defects which do not exist in the present invention.

A further publication must be mentioned in this field, namely the German patent application DOS No. 1,927,740, which relates to a device and method for filtering sludges. The claim relating to the method (claim 7), the most general, reads as follows:

"An electrical filtration method for purifying a medium comprising several phases in accordance with which the medium to be filtered is poured into a vessel containing a filter element and its liquid phase is withdrawn continuously through an outlet situated at the bottom of the filter, characterised in that the movement and separation of the solid particles and liquids constituting the multi-phase medium are accelerated by applying a potential difference between an electrode disposed in the filter element and another electrode in contact with the medium to be filtered in such a manner as to create an electric field in the vessel".

In addition, one of the figures of the drawing of this reference (FIG. 4) represents an inverted cone-frustum vessel, the bottom of which is constituted by a central perforated cone (cathode) through which the filtration water flows continuously, the dehydrated solid material being equally continuously eliminated through annular apertures in the lower base of the trunk of the cone (small base). This device has some analogy with one of the embodiments of the invention, and at first sight its operation resembles that of the claimed method. However it differs therefrom by two points of undeniable practical importance, namely there is no means envisaged for circulating the sludge, and in addition the electrodes are not face to face and are not parallel to each other, this preventing the creation of a homogeneous electric field as required for effective electro-filtration. Consequently, this known device does not have the advantages of the devices which effect the present invention as will be seen hereinafter. In this respect, the present method can be effected by means of a device comprising a tubular chamber of rectangular cross-section, of which one of the generating faces comprises a cathode conducting grating, and the opposite face an anode belt. The dimensional parameters of these members depend essentially on the physical-chemical characteristics of the sludge to be filtered, on its water content, on its fluidity, on the size of the particles, on their mutual affinity etc. These parameters can be easily determined by the expert of the art according to requirements. Thus, in general, with the present method extraction rates of the order of 60% of the water contained in the sludge in 15 to 30 minutes can be attained.

PREFERRED EMBODIMENTS OF THE INVENTION

The accompanying drawing shows three embodiments of the device for effecting the method.

Figures 1, 2:
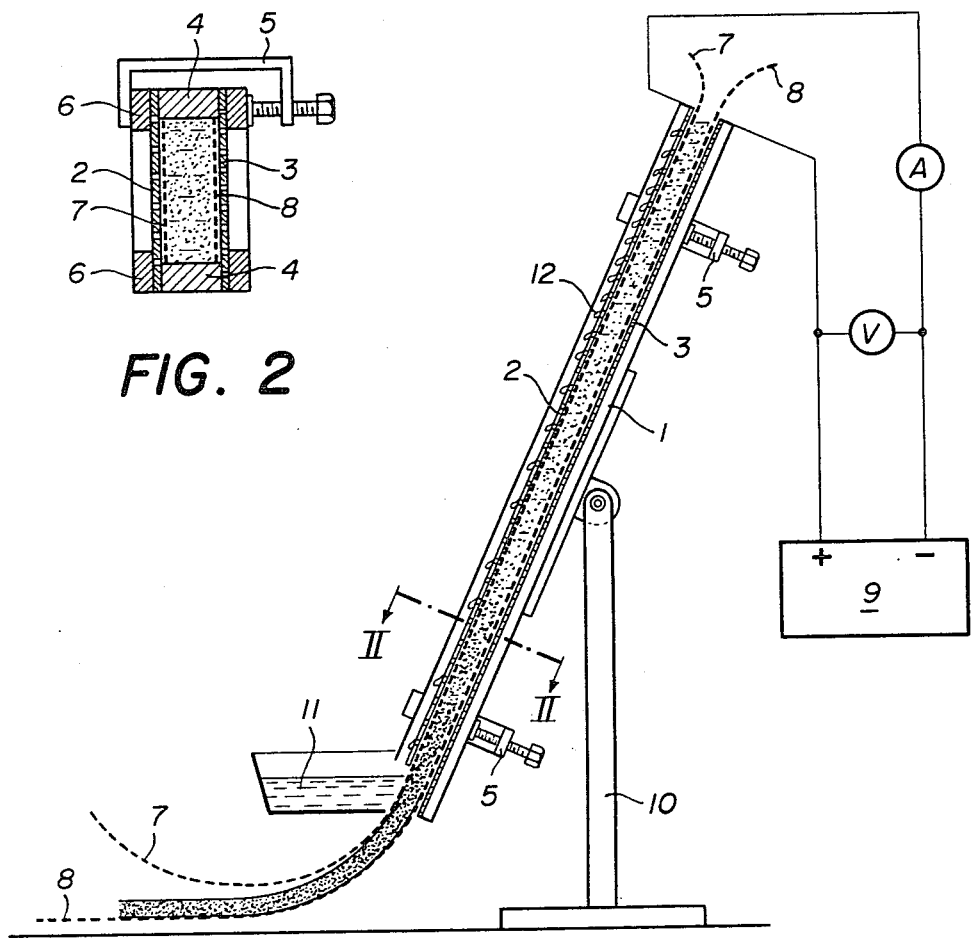
FIG. 1 is a diagrammatic section through a filtration enclosure viewed in its working position.
FIG. 2 is a section through this enclosure on the line II—II.

The device shown in FIG. 1 comprises a tubular chamber 1 constituted by two perforated metal plates 2 and 3 separated by side pieces 4 of insulating material, the assembly being kept in place by clamps 5 acting on the longitudinal members 6.

The device comprises two mobile belts of plastics or metal filtering fabric 7 and 8 which can slide longitudinally in contact with the plates 2 and 3, these latter being connected to the negative and positive terminals respectively of a direct current generator 9.

The device also comprises a support 10 and a water recovery tank 11.

In operating the present device, the sludge to be filtered in the form of a fluid suspension is introduced into the upper opening of the chamber 1 between the free portions of the belts 7 and 8, and a direct voltage is then applied across the electrodes 2 and 3 so that electro-filtration takes place, the water flowing in the form of droplets 12 which accumulate in the tank 11. As the sludge descends in the chamber 1, it is subjected to an increasing hydrostatic pressure, the extent of which depends on its position relative to the upper inlet level. This pressure increase compensates for the normal slowing down of the filtration due to the reduction in the water content of the sludge, and this is done without said pressure attaining too high values which could lead to clogging of the filter. Furthermore, as it descends, the sludge thickens due to its loss of water, and in order to facilitate its movement at the end of its path it is entrained by moving the filter belts 7 and 8 by traction in a downward direction. Thus at the filter outlet a compact cake of filtered sludge is obtained which has lost a considerable quantity of its initial water and can be handled easily with tools (shovels).

Figure 3:
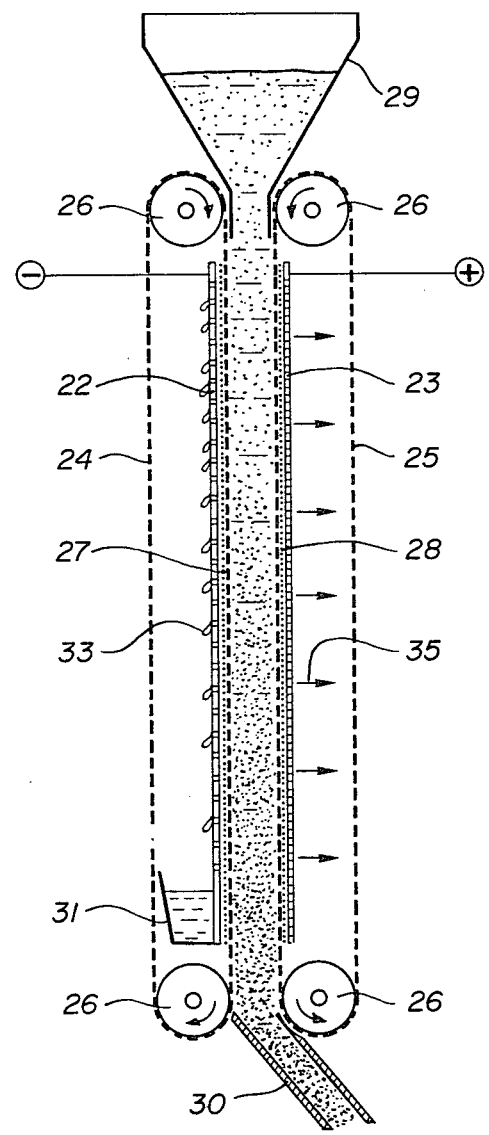
FIG. 3 is a more elaborate modification of the filtration enclosure.

The modification shown diagrammatically in FIG. 3 comprises the following main operational members:

A cathode 22, an anode 23, equally constituted by perforated metal plates, for example of stainless steel. Two fixed gratings, 27 and 28 respectively, comprising very fine meshes (from about 10 to 100 μm) mounted and fixed on to the electrodes 22 and 23. Two endless belts 24 and 25 in the form of coarse gauze of insulating material, moved continuously by a motor, not shown, by way of drive rollers 26. A feed hopper 29, as outlet conduit 30 and a water tank 31.

In operating said modification, the sludge is fed through the hopper 29, and is moved from the top to the bottom of the apparatus by the perforated belts 24 and 25. While circulating, said sludge is subjected to the field created by the perforated electrodes 22 and 23 and to the hydrostatic pressure produced by its own weight. Consequently, filtration proceeds regularly, and the droplets 33 accumulate at the bottom of the apparatus while any gas produced by the action of the electric current on the sludge escapes through the perforated anode 35. The dehydrated sludge is evacuated at the end of its travel through the conduit 30 in the form of a pudding of semi-solid consistency which can be easily loaded into a lorry and transported as ordinary earth.

Figure 4:
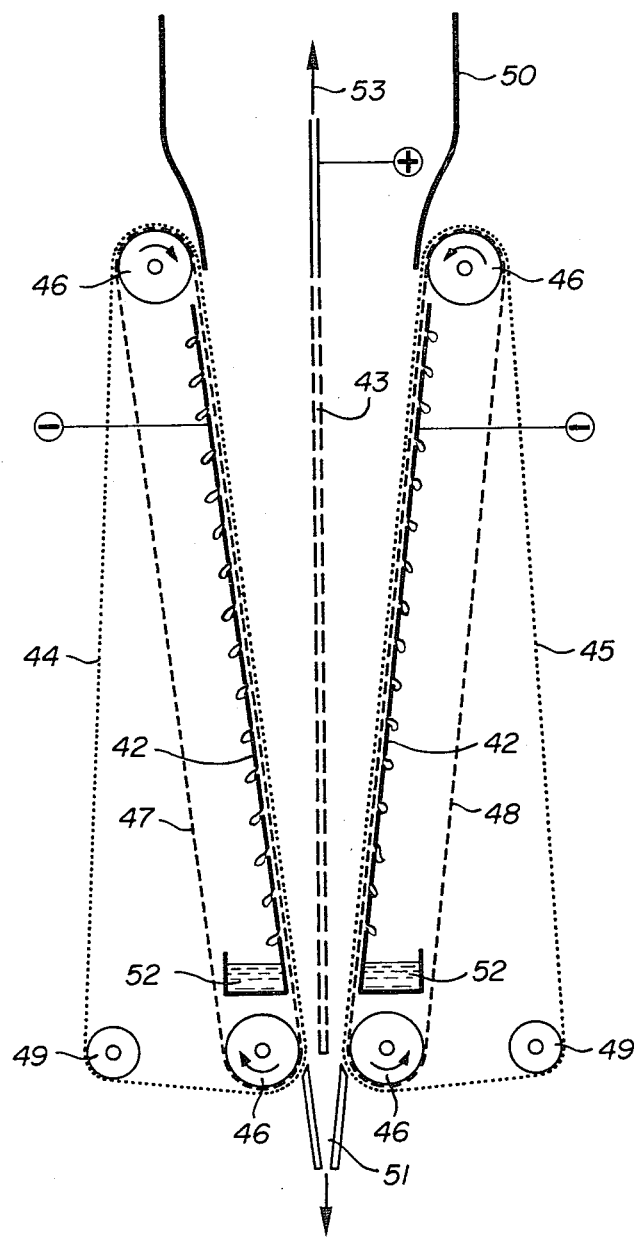
FIG. 4 is a modification of the enclosure of FIG. 3 which gives better performance.

The modification shown in FIG. 4 comprises two perforated cathodes 42 disposed symmetrically on one side and the other of a central perforated hollow anode 43, these electrodes being constructed of a metal which is inert under working conditions, for example of stainless steel. The device also comprises bands 44 and 45 of fabric or very fine mesh filter gauze which, in the filtration zone, cling to coarse mesh endless belts 47 and 48 driven continuously by rollers 46 by the action of a motor, not shown on the drawing. As can be seen from the drawing, the trajectory of the bands 44 and 45 is not the same as that of the belts 47 and 48 outside the filtration zone, the former being deviated outwards by tightening devices provided with pulleys, these being shown on the drawing by the reference numeral 49. The device also comprises a feed hopper 50, an outlet conduit 51, and tanks 52 for collecting the filtration water.

In its operation, this modification behaves as the modification shown in FIG. 3, except for the fact that its filtration action is symmetrical about its longitudinal axis occupied by the anode. As this latter is hollow, any gas produced by anodic reaction escapes into the inside of the anode and is expelled upwards as indicated by the arrow 53. In addition, as the filter bands 44 and 45 are disposed between the sludge to be filtered and the drive belts 47 and 48 and move in harmony with them, these latter are protected against contamination by the sludge, and this facilitates maintenance of the drive mechanism and reduces its wear. During the operation of the device, the sludge adhering to the filter fabric or gauze of the bands 44 and 45 can be easily removed by scraping or washing at the level of the rollers 49. The devices used for scraping or washing (for example by means of a water jet) are conventional, and have not been shown in order not to complicate the reading of the drawing.

PRACTICAL APPLICATION

The example given hereinafter illustrates the invention.

Example

A device conforming to that described with reference to FIG. 3 is used, its dimensions being approximately the following: perforated plates 22 and 23: 25×200 cm. Distance between the electrodes: 4 cm. The perforated plates are of 1 mm stainless steel plate comprising 0.5 cm holes located at about 2–3 cm from each other. The gratings 27 and 28 are of stainless steel or nickel, with 80 μm meshes.

The clayey sludge originating from a gravel pit is introduced through the upper hopper, this sludge containing about 600 g of mineral materials per liter. The perforated polyethylene drive belts 24 and 25 are then moved at a speed of about 50 cm/min., and at the same time a voltage of 15 V/cm is established between the electrodes. The water flows through the perforations in the cathode 22 and accumulates in the tank 31, whereas the concentrated sludge is extracted through the pipe 30 after having lost about 60% of its initial water.

The electricity consumption is of the order of 15 KWh per $m^3$ of water extracted, at a current density of about 0.3 A/$dm^2$.

We claim:

1. A method for dewatering a sludge of fine particles dispersed in water, comprising:
   feeding the sludge into the top of a substantially vertical, elongated tubular electrofiltration enclosure having at least one wall permeable to water but impermeable to the particles;
   passing the sludge along an elongated anode and in intimate contact therewith, and positioning a cathode in parallel or converging relation in the direction of displacement of the sludge with said anode;
   continually circulating the sludge from top to bottom along the length of the substantially vertical enclosure, thereby increasing the hydrostatic pressure on said sludge for expelling water through said one water-permeable wall; and
   applying an electric field to said sludge along substantially the length of said enclosure for inducing the passage of water through said permeable wall by electro-osmosis concurrently to the step of continually circulating the sludge wherein the increasing hydrostatic pressure gradually augments and reinforces the dewatering process by electro-osmosis as the sludge descends and thickens along said enclosure.

2. The method of claim 1 wherein the step of applying an electric field includes perforating said cathode and conjoining said cathode with said at least one water-permeable wall.

3. The method of claim 1 wherein the step of applying an electric field includes the steps of forming the cathode of material permeable to water but not permeable to said particles and wherein said water permeable cathode forms said water permeable wall.

4. The method of claim 1 wherein said anode is gas conductive and impermeable by said particles and wherein the step of passing sludge along the anode includes the step of conducting gas out of said sludge through said anode.

5. The method of claim 1, wherein the electric field between the anode and cathode is in the range of from 10–70 v/cm.

6. The method of claim 1 wherein continuously circulating the sludge through the enclosure from top to bottom includes drawing the sludge through the enclosure by frictional action between the sludge and perforated moving endless belts deposited between the mass of the sludge and walls of the enclosure whereby, the motion of the belts imposes no substantial added pressure to the hydrostatic pressure resulting from the height of the sludge in the substantially vertical tubular filtration enclosure.

7. Apparatus for continuously dewatering a sludge of fine particles dispersed in water comprising: an elongated, substantially vertical, tubular filtration enclosure of rectangular cross-section, a porous cathode electrode forming one longitudinal side of said enclosure and a porous anode electrode forming the opposite longitudinal side of said enclosure, said porous electrodes being impermeable to said particles; a pair of endless perforated belts mounted face to face individually in contact with the cathode and the anode, said belts being mounted for movement along the inside surface of, and from top to bottom of, said enclosure; means for feeding sludge into the top of the enclosure between said belts; means for generating an electric field between said electrodes to induce the passage of water through the porous cathode, whereby water is expelled from said sludge through the porous cathode by electro-osmosis and the increasing hydrostatic pressure as said sludge progresses downward through said enclosure.

8. The apparatus of claim 7 wherein said cathode side of the tubular filtration enclosure comprises a perforated metal plate covered with a very fine mesh fabric.

9. The apparatus of claim 8 wherein said mesh fabric is formed from metal and its mesh diameter is from 10 to 100$\mu$.

10. The apparatus of claim 8 wherein said mesh fabric is formed from plastic wire and its mesh diameter is from 10 to 100$\mu$.

11. An apparatus for continuously dewatering a sludge of fine particles dispersed in water comprising:
a hollow perforated anode electrode disposed axially in a vertical elongated tubular filtration enclosure, at least one pair of opposite sides of which converge from top to bottom, said converging sides including two perforated cathode electrodes disposed symmetrically on opposite sides of the perforated anode;
a pair of endless drive belts and filter bands, an individual combination of a belt and a band of the pair moving substantially vertically in harmony over each of the cathodes, the belt being adjacent the cathode and the band disposed between the sludge and the belt;
means for feeding sludge into the top of the enclosure and between said belts;
means for generating an electric field between said electrodes to induce the passage of water through at least one porous cathode whereby, water is expelled from said sludge through the latter porous cathode by electro-osmosis and increasing hydrostatic pressure as the sludge progresses downward through said enclosure; and
an outlet for removing said dewatered sludge.

* * * * *